(12) United States Patent
Merz et al.

(10) Patent No.: US 10,399,027 B2
(45) Date of Patent: Sep. 3, 2019

(54) AIR FILTER COMPRISING A MULTILAYER FILTER MATERIAL

(71) Applicant: Mahle International GmbH, Stuttgart (DE)

(72) Inventors: Katharina Merz, Stuttgart (DE); Markus Michael, Ilsfeld (DE); Birgit Renz, Marbach (DE)

(73) Assignee: Mahle International GmbH (DE)

(*) Notice: Subject to any disclaimer, the term of this patent is extended or adjusted under 35 U.S.C. 154(b) by 150 days.

(21) Appl. No.: 15/561,521

(22) PCT Filed: Mar. 18, 2016

(86) PCT No.: PCT/EP2016/055957
§ 371 (c)(1),
(2) Date: Sep. 25, 2017

(87) PCT Pub. No.: WO2016/150851
PCT Pub. Date: Sep. 29, 2016

(65) Prior Publication Data
US 2018/0065070 A1    Mar. 8, 2018

(30) Foreign Application Priority Data
Mar. 26, 2015   (DE) .................. 10 2015 205 551

(51) Int. Cl.
*B01D 53/04* (2006.01)
*B01D 46/00* (2006.01)
(Continued)

(52) U.S. Cl.
CPC ..... *B01D 46/0036* (2013.01); *B01D 46/0038* (2013.01); *B01D 53/0407* (2013.01);
(Continued)

(58) Field of Classification Search
CPC ................. B01D 53/04; B01D 53/0407; B01D 46/0036; B01D 46/0038; B01D 2253/102;
(Continued)

(56) References Cited

U.S. PATENT DOCUMENTS 4,250,172 A * 2/1981 Mutzenberg ....... B01D 39/1607
442/6
5,714,126 A    2/1998 Frund
(Continued)

FOREIGN PATENT DOCUMENTS

DE     19817703 A1   11/1999
DE   102005016677 A1   10/2006
(Continued)

OTHER PUBLICATIONS

English abstract for JP-H10230118.
English abstract for DE-19817703.
English abstract for DE-102009021020.

*Primary Examiner* — Frank M Lawrence, Jr.
(74) *Attorney, Agent, or Firm* — Fishman Stewart PLLC

(57) ABSTRACT

A multi-layer filter material for an interior air filter element of an air conditioning system of a vehicle may include an active layer having a plurality of non-impregnated activated carbon particles, an impregnation layer having a plurality of impregnated activated carbon particles, and an ion exchange layer having a plurality of ion exchanger particles. The active layer may be arranged between the ion exchange layer and the impregnation layer. The active layer may further include a first ash content and the impregnation layer may further include a second ash content. The first ash content in the active layer may be less than the second ash content in the impregnation layer.

25 Claims, 3 Drawing Sheets

(51) Int. Cl.
*B01J 39/04* (2017.01)
*B01J 20/04* (2006.01)
*B01J 20/20* (2006.01)
*B01J 20/32* (2006.01)
*B01J 20/28* (2006.01)

(52) U.S. Cl.
CPC .......... *B01J 20/043* (2013.01); *B01J 20/046* (2013.01); *B01J 20/20* (2013.01); *B01J 20/28004* (2013.01); *B01J 20/28052* (2013.01); *B01J 20/3204* (2013.01); *B01J 20/3236* (2013.01); *B01J 39/04* (2013.01); *B01D 2253/102* (2013.01); *B01D 2253/206* (2013.01); *B01D 2253/25* (2013.01); *B01D 2257/106* (2013.01); *B01D 2257/302* (2013.01); *B01D 2257/304* (2013.01); *B01D 2257/404* (2013.01); *B01D 2257/406* (2013.01); *B01D 2257/702* (2013.01); *B01D 2257/91* (2013.01); *B01D 2259/4145* (2013.01); *B01D 2259/4146* (2013.01); *B01D 2259/4566* (2013.01); *B01D 2275/10* (2013.01)

(58) Field of Classification Search
CPC .......... B01D 2253/206; B01D 2253/25; B01D 2257/106; B01D 2257/302; B01D 2257/304; B01D 2257/404; B01D 2257/406; B01D 2257/702; B01D 2257/91; B01D 2259/4145; B01D 2259/4146; B01D 2259/4566; B01J 20/043; B01J 20/046; B01J 20/20; B01J 20/28004; B01J 20/28052; B01J 20/3204; B01J 20/3236; B01J 39/04
USPC .......................... 96/132, 134, 135, 153, 154
See application file for complete search history.

(56) References Cited

U.S. PATENT DOCUMENTS

| | | | |
|---|---|---|---|
| 5,772,738 A * | 6/1998 | Muraoka | B01D 46/0023 55/385.2 |
| 7,132,007 B1 * | 11/2006 | von Blucher | B01D 53/02 95/90 |
| 9,242,202 B2 | 1/2016 | Boehringer et al. | |
| 2004/0237790 A1 * | 12/2004 | von Blucher | A62D 5/00 96/154 |
| 2006/0225574 A1 | 10/2006 | Braeunling et al. | |
| 2017/0320053 A1 * | 11/2017 | Moon | B01J 47/12 |

FOREIGN PATENT DOCUMENTS

| | | |
|---|---|---|
| DE | 102009021020 A1 | 11/2010 |
| DE | 102012007503 A1 | 10/2013 |
| JP | H10230118 A | 9/1998 |
| WO | WO-01/70391 A1 | 9/2001 |

* cited by examiner

AIR FILTER COMPRISING A MULTILAYER FILTER MATERIAL

CROSS-REFERENCE TO RELATED APPLICATIONS

This application claims priority to International Patent Application No.: PCT/EP2016/055957 filed on Mar. 18, 2016, and German Patent Application No.: DE 10 2015 205 551.5 filed on Mar. 26, 2015, the contents of which are each incorporated herein by reference in their entirety.

TECHNICAL FIELD

The present invention relates to a multilayer filter material for an interior air filter of a vehicle. The invention also relates to an interior air filter for an air conditioning system of a vehicle, which is produced with the aid of such a multilayer filter material. Finally, the present invention relates to an air conditioning system for a vehicle that is equipped with at least one interior air filter of this type.

BACKGROUND

In vehicles, in particular in road vehicles, there is a need to supply clean air to a vehicle interior, preferably a passenger compartment. The air supply for the vehicle interior usually takes place with the aid of an air conditioning system, which sucks in air from the interior, cleans it with the aid of an interior air filter, and returns it to the interior (recirculating air mode), or sucks in fresh air from the environment, cleans it with the aid of the interior air filter, and supplies it to the interior (fresh air mode). Likewise, in the case of modern air conditioning systems, any number of intermediate settings between such a recirculation mode and such a fresh air mode are possible (mixed air mode). While such an interior air filter originally only had to filter out coarse impurities from the air, the requirements for such interior air filters and the filter materials thereby used have constantly increased. Meanwhile, with the aid of an interior air filter, a purification of the sucked-in air from pollen, fine dust and odours is to be achieved. In particular, the removal of odours from the sucked-in air presents difficulties, since different odorous substances also require different filter materials. However, if a corresponding number of different filter materials are required for an increasing number of different odorous substances, the flow resistance of the air filter increases, which impedes economical operation of the air conditioning system. Multilayer filter materials are therefore preferably used; these always represent an optimised compromise for the respective cleaning task. If such an air filter can filter out both particulate impurities, i.e. solid and/or liquid impurities, as well as gaseous impurities from the air, such an air filter is frequently also referred to as a hybrid filter. Such hybrid filter are often specified by means of requirement specifications, which generally take into account the following gases: n-butane, toluene, sulphur dioxide, nitrogen oxides, ozone. These hybrid filters are, for example, specified in accordance with ISO standard 11155 part 2. This standard specification, however, represents odour loads that were determined in European urban centres about 30 years ago. Today's external air conditions, such as those available in the urban areas of Europe and especially in Asia, differ from these earlier external air conditions. For example, the environmental air nowadays can contain amines and aldehydes that transport odours, and which cannot be filtered, or only inadequately, by the above-mentioned hybrid filters in accordance with the standard specification.

A filter element with a multilayer filter material is of known art from DE 10 2005 016 677 A1, in which an active layer with activated carbon fibres is provided, which is arranged on the inflow side, which is followed by an adsorber layer with granular adsorbents on the outflow side. A further active layer with activated carbon fibres can adjoin this adsorber layer on the outflow side. The adsorbents used here can comprise activated carbon, zeolites, cyclodextrins, silicates, ion exchangers and aluminosilicates.

DE 10 2012 007 503 A1 discloses another adsorptive filter medium, in which a plurality of first filter layers are provided with a first adsorption substance and a plurality of second filter layers differing from the first filter layers are provided with a second adsorption substance; these alternate with one another and have differing flow resistances or pressure losses.

A further adsorptive filter material is of known art from DE 10 2009 021 020 A1 and contains an exchange resin that is loaded with metal cations.

SUMMARY

The present invention is concerned with the problem of specifying an improved embodiment for a filter material of the type cited in the introduction, and for an interior air filter element equipped with the latter, and for an air conditioning system equipped with the latter, which is characterised in particular by an efficient cleaning action for a plurality of different odorous substances with a comparatively low flow resistance.

This problem is solved in accordance with the invention by the subject matter of the independent claims. Advantageous embodiments are the subject matter of the dependent claims.

The invention is based on the general concept of equipping the filter material with at least three layers, which are adjacent to one another, that is to say, they are layered one upon another, in the flow direction of the filter material. In accordance with the invention, here this takes the form of at least one active layer, which has non-impregnated activated carbon particles, an impregnation layer, which has impregnated activated carbon particles, and an ion exchange layer, which has ion exchanger particles. Thus, at least three functional layers are proposed for the multilayer filter material, which differ from one another in terms of different cleaning functions. In accordance with the invention, these cleaning functions, or functional layers, are specifically coordinated with one another such that a particularly efficient cleaning action is established for a plurality of odorous substances. In particular, it has been shown that with the three proposed layers of different adsorbents, the following pollutants could be removed particularly efficiently from the respective airflow: ammonia, acetaldehyde, hydrogen sulphide, 2-butanone, trimethylamine, hexanal, propionic acid and n-butane. Surprisingly, many investigations have shown that a multilayer arrangement of these different adsorbents exhibits a higher efficiency than a single-layer arrangement of a corresponding mixture of these adsorbents. Since in principle only these three functional layers are required, an associated air filter element can also be implemented with a comparatively low flow resistance.

A configuration in which the active layer is arranged between the ion exchange layer and the impregnation layer has been found to be particularly expedient.

For the application, it has been found to be advantageous if the ion exchange layer in the installed state is arranged upstream of the impregnation layer with respect to a flow direction intended for the filter material.

Particularly high degrees of adsorption can be realised by the following embodiments, which can be implemented alternatively, or cumulatively, or in any desired combination. For example, an ash content of the active layer can be limited to a maximum of 3% by weight. The ash content in the active layer is preferably smaller, in particular at least 50% smaller, than in the impregnation layer. Furthermore, the active layer can comprise non-impregnated activated carbon particles having a grain size of 30×60 or 30×70 mesh, wherein "mesh" corresponds to the mesh width of a screen that is still permeable to granules with the said grain size.

The impregnation layer can be produced with activated carbon particles, wherein "impregnation" means that the adsorption capacity of the activated carbon particles for hydrocarbons has been reduced by means of an additive. For example, the activated carbon particles have been treated by means of an acidic, and/or basic or alkaline solution. For example, the impregnation layer can have activated carbon particles impregnated with potassium iodide. Additionally or alternatively, the impregnation layer can have activated carbon particles impregnated with potassium carbonate (potash). Preference is given to a variant in which the impregnation layer has both a proportion of activated carbon particles impregnated with potassium iodide and a proportion of activated carbon particles impregnated with potassium carbonate. Here the proportion impregnated with potassium iodide is preferably greater than the proportion impregnated with potassium carbonate. In particular, the proportion impregnated with potassium iodide is approximately twice as large as the proportion impregnated with potassium carbonate. A particularly advantageous composition is one in which the impregnation layer has a proportion by weight of 10% activated carbon particles impregnated with potassium iodide, a proportion by weight of 5% of activated carbon particles impregnated with potassium carbonate, wherein the remaining 85% by weight is composed of non-impregnated activated carbon particles and ash. The ash accumulated during activation of the activated carbon also has an impregnation effect, since it blocks the pores of the activated carbon, and thereby reduces the surface area available for the adsorption of the hydrocarbons. The above percentages can here vary by ±2% points between the individual proportions.

Particularly advantageous is an embodiment in which the ion exchange layer is hygroscopic and contains ions, which with water form a toxic environment. The hygroscopic ion exchange layer absorbs water from the airflow. On the one hand, this is achieved by the fact that much less moisture reaches the respective subsequent layer, so that microorganisms that can accumulate there are lacking an essential component for biological growth, namely water. By this means a multiplication of the microorganisms can be efficiently reduced. On the other hand an aforementioned toxic environment is created in the ion exchange layer by the water in combination with the ions, which acts against biological growth in the ion exchange layer. Also, a large proportion of the microorganisms that are exposed to this toxic environment on their path through the ion exchange layer are killed. Microorganisms, such as, for example, bacteria, algae and fungi, can accumulate on the filter material and grow in moisture and multiply so that they can enter the airflow that is introduced into the passenger compartment. As a result of the toxic action of the ion exchange layer, the exposure of the passengers to such microorganisms can be reduced.

A further advantageous development is one in which the ion exchange layer contains acid ions, which with water form an acidic environment. Such an acidic environment, which, for example, has a pH value of at most 3.0, is extremely detrimental to microorganisms.

The ion exchange layer can in principle be designed such that it permanently binds disruptive anions and/or disruptive cations to itself. The ion exchange layer preferably has cation exchanger particles. In particular, the ion exchange layer can have ion exchange particles with sulphuric acid groups. Furthermore, the ion exchange particles can at least be partially fibrous in form and incorporated into a non-woven material layer with filter material fibres. The filter material fibres can be, for example, plastic fibres or cellulose fibres, or a mixture thereof. It is also conceivable to configure the ion exchanger particles at least partially in powder form, and to incorporate them into a non-woven material layer with filter material fibres, wherein plastic fibres and/or cellulose fibres can again be used for the non-woven material layer.

Surprisingly, it has also been found to be particularly advantageous to maintain a specific sequence for the different functional layers. Accordingly, an increased efficiency can be achieved in accordance with a preferred embodiment if the active layer is arranged between the impregnation layer and the ion exchange layer, preferably such that the active layer directly adjoins the impregnation layer and, on the other hand, directly adjoins the ion exchange layer.

In addition to the sequence of the individual functional layers, it has also surprisingly been found that, in the case of the throughflow with the airflow to be cleaned, a particular order of the functional layers is also important. In accordance with a preferred embodiment, which is characterised by a particularly high efficiency with regard to the cleaning action for odorous substances, the ion exchange layer is arranged on the inflow side, while the impregnation layer is arranged on the outflow side. The active layer is again located between the ion exchange layer and the impregnation layer.

In accordance with another advantageous embodiment, the impregnation layer can comprise a non-woven material of filter material fibres and form an outer side of the filter material. The impregnation layer simultaneously serves as a supporting layer for the filter material. In accordance with another advantageous embodiment, the impregnation layer can have a non-woven material of filter material fibres and form an outer side of the filter material. In this case, the ion exchange layer serves as a supporting layer for the filter material. If the two above variants are implemented cumulatively, the filter material has precisely three functional layers, namely the impregnation layer serving as a supporting layer, preferably on the outflow side, the ion exchange layer serving as a supporting layer preferably on the inflow side, and the active layer arranged between impregnation layer and ion exchange layer.

In an alternative embodiment, the ion exchange layer can, on the one hand, directly adjoin the active layer and, on the other hand, directly adjoin a separate, additional supplementary layer, which can also be referred to in what follows as a first supplementary layer and in particular also as a supplementary layer on the inflow side. Additionally or alternatively, the impregnation layer can, on the one hand, directly adjoin the active layer and, on the other hand, directly adjoin a separate, additional supplementary layer, which with reference to the supplementary layer already cited above can also be designated as a second supplementary layer, and in particular also as a supplementary layer on the outflow side. In a cumulative implementation of the above variants, the filter material has precisely five layers, namely in particular the first supplementary layer, the ion exchange layer, the active layer, the impregnation layer and the second supplementary layer, successively following one another in the flow direction.

In an alternative build, a third separate supplementary layer can be provided. In this case, the ion exchange layer on the one hand adjoins directly a first supplementary layer, while the impregnation layer on the one hand directly adjoins the active layer and, on the other hand, directly adjoins a second supplementary layer. On the other hand, the ion exchange layer is directly adjacent to a third supplementary layer, which, in turn, is directly adjacent to the active layer. Thus, in this case, the filter material consists of the ion exchange layer, the active layer, the impregnation layer and the three supplementary layers.

Another alternative proposes a fourth supplementary layer. In this case, provision is made for the ion exchange layer, on the one hand, to directly adjoin a first supplementary layer, for the impregnation layer to directly adjoin a second supplementary layer, for the ion exchange layer to adjoin directly a third supplementary layer, and for the impregnation layer to be directly connected to a fourth supplementary layer, and for the active layer, on the one hand, to directly adjoin the third supplementary layer and, on the other hand, to directly adjoin the fourth supplementary layer. Accordingly, in this case, the filter material consists of the ion exchange layer, the active layer, the impregnation layer and the four supplementary layers.

The respective supporting layer can be constructed as a single-layer or multilayer design. The respective supporting layer can, for example, be designed as a single-layer or multilayer supporting layer, which has essentially no filtration action, but serves primarily so as to stiffen the filter material. For example, such a supporting layer can be characterised in that it is permeable to solid and/or liquid particles up to a grain size of 1 mm. The supporting layer can at the same time be impermeable to relatively large particles, e.g. for particles from a grain size of 1 mm. In this respect, the supporting layer can also be designated as a macrofilter layer.

Alternatively, the respective supplementary layer can be configured as a single-layer or multilayer particle filter layer, which is characterised by a significant filtration action, but is usually rather flexible. For example, such a particle filter layer can be characterised in that it is impermeable to liquid and/or solid particles from a grain size of 0.1 mm. In this case, the particle filter layer is designed as a microfilter layer. It can also be configured as a nanofilter layer if it is impermeable to particles from a grain size of 0.1 μm. However, such a particle filter layer can also contribute to the stiffness of the filter material and in this respect can exhibit a certain supporting action.

It can preferably be provided that at least one such supplementary layer is designed as a supporting layer, which is permeable to particles with a grain size of less than 1 mm. Additionally or alternatively, provision can be made for at least one such supplementary layer to be configured as a particle filter layer, which is impermeable to particles with a grain size of more than 0.1 mm. Preferably, provision can be made for the respective supplementary layer, when forming an inflow side or an outflow side of the filter material, to be configured as a supporting layer, which is permeable to particles with a grain size of less than 1 mm, whereas the respective supplementary layer, if forming either an inflow side or an outflow side of the filter material, can advantageously be designed as a particle filter layer, which is impermeable to particles with a grain size of more than 0.1 mm. It is also conceivable to configure the outerlying supplementary layers as particle filter layers and to configure the inner-lying supplementary layers as supporting layers. The individual layers are expediently coordinated with one another such that, in the flow direction, a gradient of coarse to fine is produced with respect to the filtration effect, so that the coarser impurities, such as e.g. particles, can be trapped first, while the finer impurities can penetrate deeper into the filter material. By this means, the entire thickness of the filter material can be utilised for storing impurities. This also protects the active layers from particles. For example, the pore size of the supplementary layers can increase from the inflow side to the outflow side, provided that two or more supplementary layers are used, in particular from a macrofilter layer via a microfilter layer to a nanofilter layer.

Adjacent layers can be bonded together with adhesive. A thermal connection is also possible, e.g. by plasticisation.

An interior air filter element in accordance with the invention for an interior air filter device of an air conditioning system of a vehicle has a filter body that is formed with the aid of a filter material of the type described above. The filter material is preferably, pleated, i.e. folded, in the filter body. The filter body can be designed to be planar, or annular. The associated filter element is then designed as a flat filter element or as an annular filter element. In principle, however, a number of other geometries for the filter body or the filter element are also conceivable.

An air conditioning system for a vehicle in accordance with the invention is equipped with an interior air filter device, which, in turn, is equipped with at least one interior air filter element of the type cited above. The ion exchange layer is expediently arranged upstream of the active layer, while the impregnation layer is arranged downstream of the active layer.

In the present context, the relative details "upstream" and "downstream" refer to a direction of flow of the airflow to be cleaned in the region of the respective filter element, which is established during operation of the air conditioning system by the flow through the respective filter element.

Further important features and advantages of the invention ensue from the subsidiary claims, from the drawings, and from the associated description of the figures with the aid of the drawings.

It goes without saying that the features mentioned above, and those that are still to be explained below, can be used not only in the respective combination specified, but also in other combinations, or in a single setting, without departing from the scope of the present invention.

Preferred examples of embodiments of the invention are illustrated in the drawings and are explained in greater detail in the following description, wherein the same reference symbols refer to the same, or similar, or functionally identical, components.

BRIEF DESCRIPTION OF THE DRAWINGS

In schematic representations.

DETAILED DESCRIPTION OF THE DRAWINGS

Figure 1:
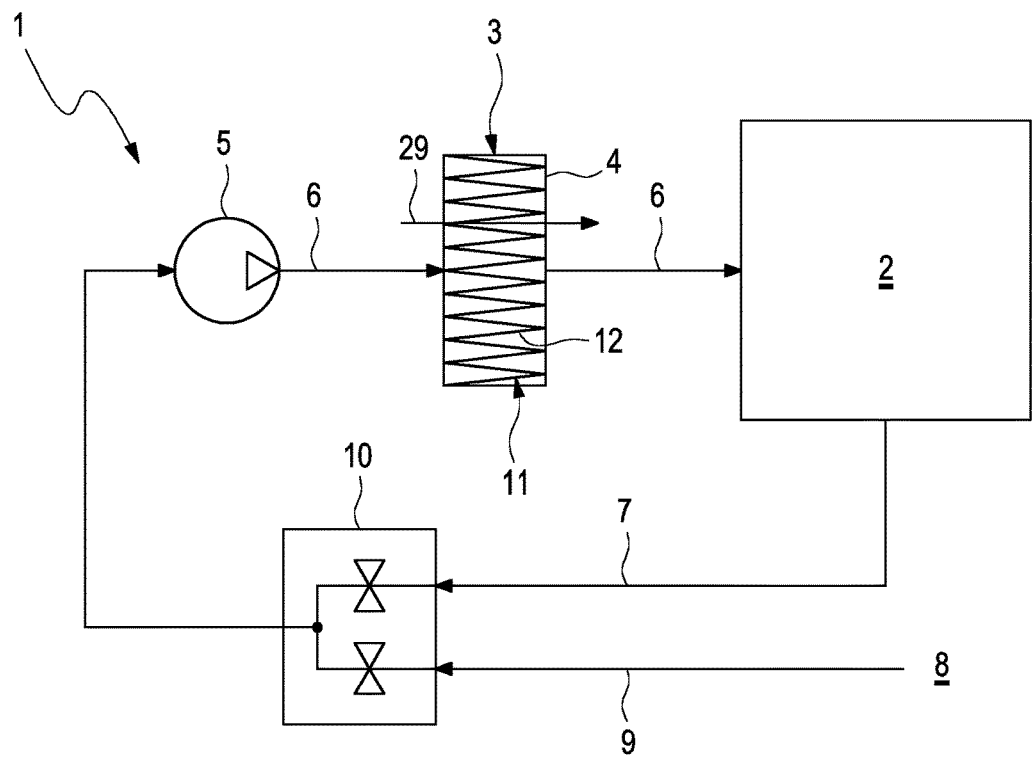
FIG. 1 shows a highly simplified, schematic diagram illustrating the principles of an air conditioning system.

In accordance with FIG. 1, an air conditioning system 1, which serves to provide air conditioning of a vehicle interior 2 of a vehicle, not otherwise shown, comprises an interior air filter device 3, which is equipped with at least one interior air filter element 4. In what follows the interior air filter device 3 can also be referred to in brief as a filter device 3. In what follows the interior air filter element 4 can also be referred to in brief as a filter element 4. The air conditioning system 1 further comprises a fan 5 for generating an airflow 6, which is supplied to the interior 2. Here the airflow 6 is passed through the filter device 3, that is to say, through the filter element 4, as a result of which the airflow 6 is cleaned. At the same time the fan 5 can suck in recirculated air 7 from the interior 2. Furthermore the fan 5 can suck in fresh air 9 from an environment 8 of the vehicle. With the aid of a flap device 10, a changeover can be made between a recirculating air mode, in which only recirculating air 7 is sucked in and supplied to the interior 2, a fresh air mode, in which only fresh air 9 is sucked in and supplied to the interior 2, and a mixed mode, in which both recirculating air 7 and fresh air 9 are sucked in and supplied to the interior 2. Further typical components of the air conditioning system 1, e.g. a heating device and a cooling device, are omitted here for the sake of clarity.

The filter element 4 has a filter body 11, which is formed with the aid of a filter material 12. The filter material 12 is expediently folded in the filter body 11. In the example of FIG. 1, the filter body 11 is represented in the form of a flat plate. In principle, an annular filter body 11 can also be provided. During operation of the air conditioning system 1, the airflow 6 flows through the filter element 4 and the filter body 11 and thus ultimately also through the filter material 12 in a flow direction 29. Accordingly, depending on the build, the filter material 12 can have a throughflow direction 29 as intended for the correct mounted state, i.e., the state when in use, which must be maintained in order that the filter material 12, that is to say, the filter element 4 equipped with the latter, can exhibit the intended filtration action(s).

The filter material 12 used here is of a multilayer design and is explained in more detail in what follows with reference to FIGS. 2 to 6.

In accordance with FIGS. 2 to 6, the filter material 12 presented here is of a multilayer design, with at least three layers. In all embodiments, the filter material 12 comprises at least one ion exchange layer 13, at least one active layer 14, and at least one impregnation layer 15. Thus, the filter material 12 presented here comprises at least these three functional layers 13, 14, 15, which act so as to adsorb odorous substances. Since the individual functional layers 13, 14, 15 can also filter out particulate impurities from the airflow 6, the filter element 4 can also be referred to as a hybrid filter.

The respective individual functional layer 13, 14, 15 can, in turn, be designed in a multilayered or multilayered manner, that is to say, it can consist of two or more individual layers abutting against one another. However, the embodiment shown here is preferred, in which the at least three functional layers 13, 14, 15 are each designed as one layer.

The active layer 14 has primarily, that is to say, as the main component, activated carbon particles 16, which are not impregnated. The proportion of non-impregnated activated carbon particles 16 is preferably at least 85% by weight, preferably at least 90% by weight, in particular at least 95% by weight. The active layer 14 can also have an ash content, which is at most 5% by weight, and is preferably a maximum of 3% by weight. This ash is produced during the processing of the activated carbon, in which "normal" carbon is activated at a high temperature of, e.g., about 1000° C. The non-impregnated activated carbon particles 16 preferably have a grain size of about 30×60 or 30×70 mesh.

The impregnation layer 15 has impregnated activated carbon particles 17, 18. The proportion of impregnated activated carbon particles 17, 18 is preferably at least 5% by weight, preferably at least 10% by weight, in particular at least 15% by weight. For example, the impregnation layer 15 can have first activated carbon particles 17 that are impregnated with potassium iodide. Additionally or alternatively, second activated carbon particles 18 can be provided that are impregnated with potassium carbonate. Finally, the impregnation layer 15 can also have third activated carbon particles 19 that are not impregnated with an additive. However, the impregnation layer 15 can also have ash, which has an impregnating action on the activated carbon since it blocks the pores of the activated carbon and thereby reduces the adsorption capacity for hydrocarbons. The impregnation layer 15 therefore preferably has an ash content that is greater than in the active layer 14. In principle, these non-impregnated third activated carbon particles 19 of the impregnation layer 15 can be the same non-impregnated activated carbon particles 16 that are also used in the active layer 14. Preference is given to a composition for the impregnation layer 15 in which are present about 10% by weight of the first activated carbon particles 17 impregnated with potassium iodide, about 5% by weight of the second activated carbon particles impregnated with potassium carbonate, and about 85% by weight of the non-impregnated third activated carbon particles 19, and ash. In the impregnation layer 15, the non-impregnated activated carbon particles 19 thus have a proportion by weight of less than 85%, preferably of less than 80%.

The ion exchange layer 13 has ion exchanger particles 20. These preferably are cation exchanger particles. The ion exchange particles 20 can contain sulphuric acid groups. Provision can also expediently be made for the ion exchange particles 20 to be at least partially fibrous in form and incorporated into a non-woven material layer with filter material fibres. It is likewise conceivable for the ion exchanger particles 20 to be at least partially formed in powder form and to integrate them into a non-woven material layer with filter material fibres. Likewise, a combined embodiment is conceivable in which both fibrous and powdered ion exchanger particles 20 are present.

The individual functional layers 13, 14, 15 have a preferred arrangement or sequence within the filter material 12 in which the active layer 14 is arranged between the ion exchange layer 13 and the impregnation layer 15. The filter material 12 preferably does not have intermediate layers, so that the active layer 14, on the one hand, directly adjoins the impregnation layer 15 and, on the other hand, directly adjoins the ion exchange layer 13. In FIGS. 2 to 6 the airflow 6 is also symbolised by arrows in order to indicate the flow direction 29 through the filter material 12 that ensues in the mounted state. Accordingly, the filter material 12 has an entry-side inflow side 21 facing the incoming airflow 6, which can also be referred to as the entry side 21, and an exit-side outflow side 22 facing away from the latter, which can also be referred to as the exit side 22.

The ion-exchange layer 13 is accordingly preferably arranged on the inflow side, that is to say, facing the inflow side 21, while the impregnation layer 15 is arranged on the outlet side and faces the outflow side 22.

Figure 2:
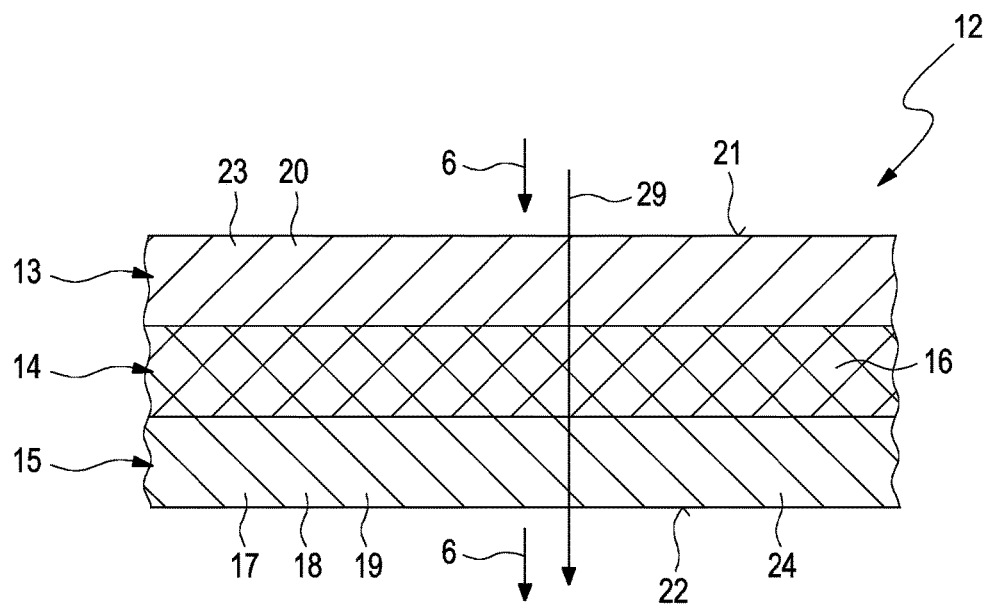
FIGS. 2-6 show in each case a sectional view of a multilayer filter material in various embodiments.

In the embodiment shown in FIG. 2, the ion exchange layer 13 has a non-woven material 23 of filter material fibres, into which the ion exchange particles 20 are embedded. Due to the non-woven material 23, the ion exchange layer 13 is sufficiently stable so that it can form a supporting layer for the filter material 12. Accordingly, in this embodiment, the ion exchange layer 13 can form an outer side, in this case the inflow side 21, of the filter material 12. In this embodiment, the impregnation layer 15 is also formed with a non-woven material 24 of filter material fibres, into which the impregnated activated carbon particles 17, 18 and possibly also the non-impregnated activated carbon particles 19 are incorporated.

Accordingly, the impregnation layer 15 can also form a supporting layer for the filter material 12 through the non-woven material 24. In the example, the impregnation layer 15 therefore also forms an outer side, namely the exit side 22 of the filter material 12. In the embodiment shown in FIG. 2, the filter material 12 thus has exactly three layers, namely the functional layers 13, 14, 15, i.e., the ion exchange layer 13, the active layer 14 and the impregnation layer 15. As mentioned above, the respective functional layer 13, 14, 15 can itself be multilayered.

Figure 3:
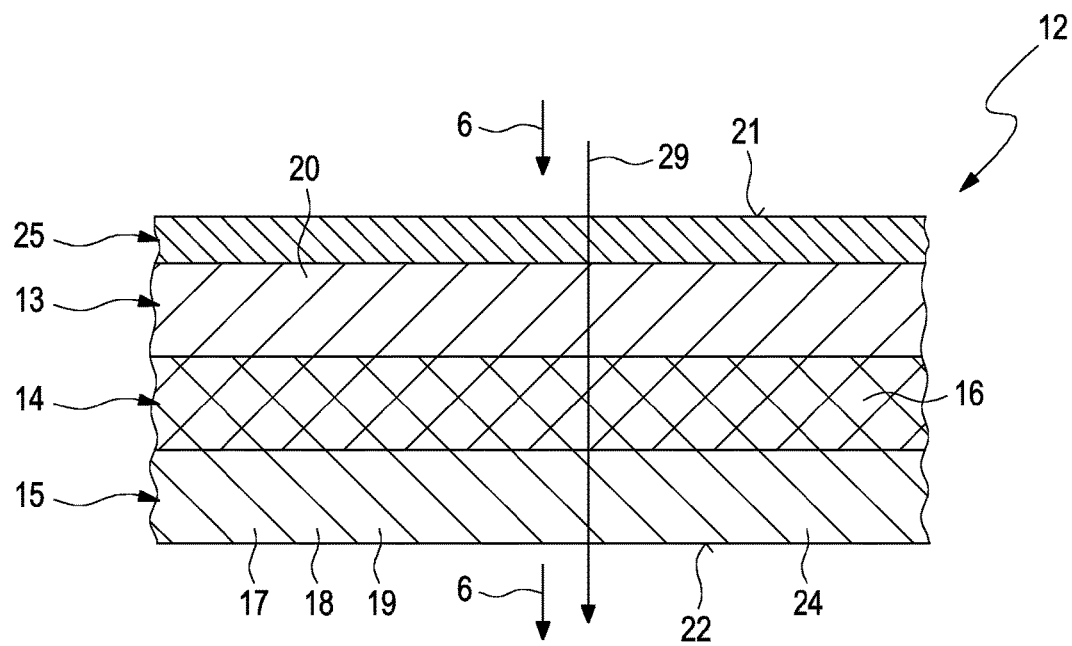

In accordance with FIG. 3, the filter material 12 can have a flow-side or first supplementary layer 25 on the inflow side, which then forms the inflow side 21 or the inlet side 21 of the filter material 12. The supplementary layer 25 is expediently a non-woven material of filter material fibres and can be designed as a supporting layer, or as a particle filter layer, depending on the pore size. The ion exchange layer 13 on the one hand adjoins the active layer 14 and, on the other hand, directly adjoins the said first supplementary layer 25. For support on the outflow side, the filter material 12 can again have the impregnation layer 15 reinforced with the non-woven material 24, as in FIG. 3. However, the embodiment shown in FIG. 4 is preferred.

Figure 4:
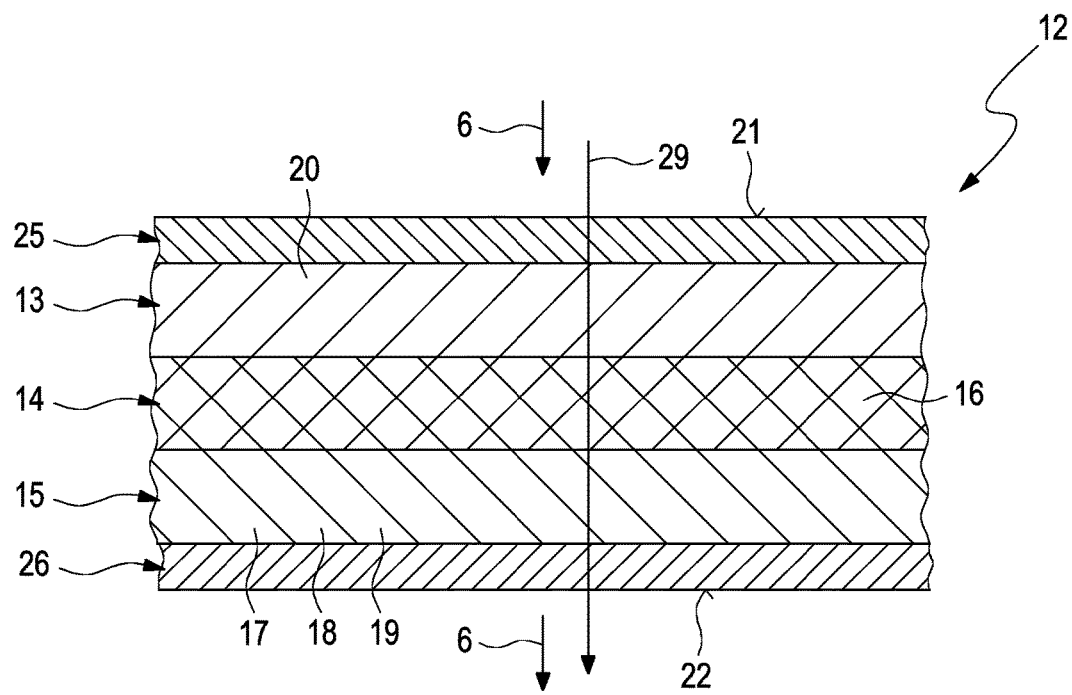

In accordance with FIG. 4, the filter material 12 has, in addition to the first supplementary layer 25 on the inflow side, a second supplementary layer 26 on the outflow side, which in this case forms the outflow side 22 or the exit side 22 of the filter material 12. The impregnation layer 15, on the one hand, thus adjoins the active layer 14 and, on the other hand, directly adjoins the second supplementary layer 26. In this embodiment the filter material 12 has exactly five layers, namely the three functional layers 13, 14, 15 and the two supplementary layers 25, 26. As mentioned, the respective individual layer can in each case be structured in a number of layers. The second supplementary layer 26 is expediently also a non-woven material of filter material fibres and can be configured as a supporting layer, or as a particle filter layer, depending on the pore size.

Alternatively, a further embodiment is conceivable that is analogous to the variant shown in FIG. 3, in which there is also only one supplementary layer, namely only the second supplementary layer 26 on the outflow side 22. In this case, the ion exchange layer 13 is again reinforced with the non-woven material 23 as in FIG. 2. In this case, as in the case of FIG. 3, the filter material 12 now has four layers, namely the three functional layers 13, 14, 15 and the respective supplementary layer 25 or 26.

As mentioned above, the respective individual layer can again be structured in several layers.

Figure 5:
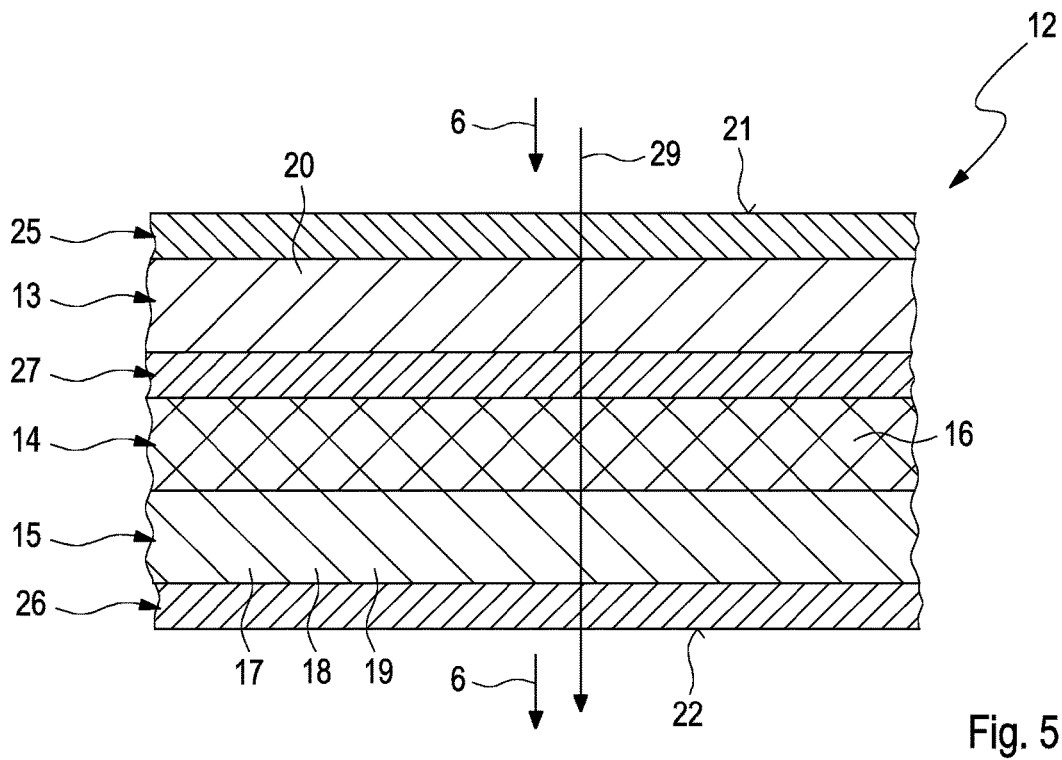

In accordance with FIG. 5, in an alternative build, a third separate supplementary layer 27 can also be provided. In this case, the ion exchange layer 13 on the one hand directly adjoins the first supplementary layer 25, while the impregnation layer 15 on the one hand directly adjoins the active layer 14 and, on the other hand, directly adjoins the second supplementary layer 26. On the other hand, the ion exchange layer 13 directly adjoins the third supplementary layer 27, which in turn directly adjoins the active layer 14. Thus, in this case, the filter material 12 consists of the ion exchange layer 13, the active layer 14, the impregnation layer 15 and the three supplementary layers 25, 26, 27. The individual layers 13, 14, 15, 25, 26, 27 follow one another in the flow direction 29 through the filter material 12 from the inflow side 21 to the outflow side 22 as intended for the mounted state as follows: The first supplementary layer 25 comes first, followed in sequence by the ion exchange layer 13, the third supplementary layer 27, the active layer 14, and the impregnation layer 15, and finally the second supplementary layer 26.

Figure 6:
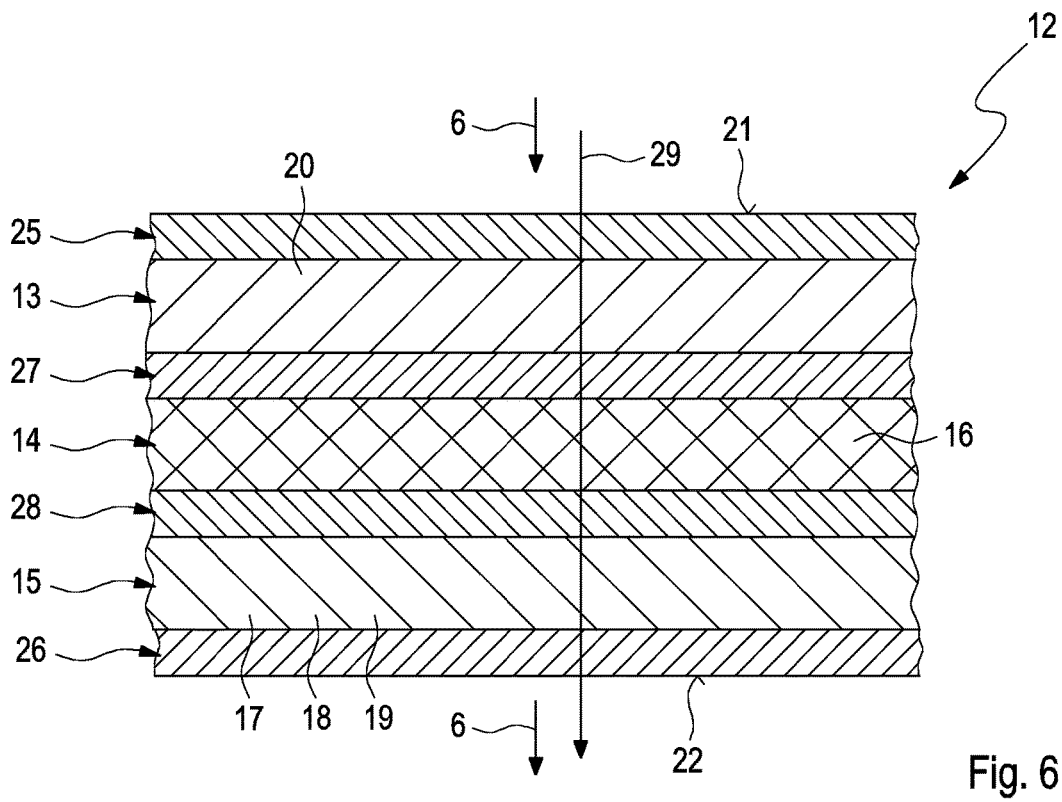

In accordance with FIG. 6, a fourth supplementary layer 28 can also be proposed for a further embodiment. In this case, it is thus provided that the ion exchange layer 13 on the one hand directly adjoins the first supplementary layer 25, that the impregnation layer 15 on the one hand directly adjoins the second supplementary layer 26, that the ion exchange layer 13 on the other hand directly adjoins the third supplementary layer 27, that the impregnation layer 15 on the other hand directly adjoins the fourth supplementary layer 28, and that the active layer 14 on the one hand directly adjoins the third supplementary layer 27 and, on the other hand, directly adjoins the fourth supplementary layer 28. Thus, in this case, the filter material 12 consists of the ion exchange layer 13, the active layer 14, the impregnation layer 15, and the four supplementary layers 25, 26, 27, 28. The individual layers 13, 14, 15, 25, 26, 27, 28 follow one another in the flow direction 29 of the filter material 12 from the inflow side 21 to the outflow side 22 as intended for the mounted state as follows: The first supplementary layer 25 comes first, followed by the ion exchange layer 13, the third supplementary layer 27, the active layer 14, the fourth supplementary layer 28 and the impregnation layer 15, and finally the second supplementary layer 26.

If the above-cited supplementary layers 25, 26, 27, 28 also have a filtration function for particulate impurities and accordingly are configured as particle filter layers, the said filtration functions can be transferred to the said "passive" supplementary layers 25, 26, 27, 28, which correspondingly relieves the "active" functional layers 13, 14, 15 from these filtration functions. These supplementary layers 25, 26, 27, 28 thus do not actively serve to adsorb common gaseous odorous substances, and thus, in particular, contain no activated carbon particles. The supplementary layers 25, 26, 27, 28 are thus preferably free of activated carbon.

The invention claimed is:

1. A multi-layer filter material for an interior air filter element of an air conditioning system of a vehicle comprising:
   an active layer having a plurality of non-impregnated activated carbon particles;
   an impregnation layer having a plurality of impregnated activated carbon particles;
   an ion exchange layer having a plurality of ion exchanger particles;
   wherein the active layer is arranged between the ion exchange layer and the impregnation layer; and wherein the active layer further comprises a first ash content and the impregnation layer further comprises a second ash content, and wherein the first ash content in the active layer is less than the second ash content in the impregnation layer.

2. The multi-layer filter material in accordance with claim 1, wherein the second ash content in the impregnation layer is at least twice as much as the first ash content in the active layer.

3. The multi-layer filter material in accordance with claim 1, wherein the ion exchange layer is upstream of the impregnation layer in relation to a flow direction of the multi-layer filter material in a mounted state.

4. The multi-layer filter material in accordance with claim 1, wherein the active layer has an ash content of one of at most 5% by weight or of at most 3% by weight.

5. The multi-layer filter material in accordance with claim 1, wherein the plurality of non-impregnated activated carbon particles of the active layer have a grain size of one of 30×60 or 30×70 mesh.

6. The multi-layer filter material in accordance with claim 1, wherein the plurality of impregnated activated carbon particles of the impregnation layer are impregnated with potassium iodide.

7. The multi-layer filter material in accordance with claim 1, wherein the plurality of impregnated activated carbon particles of the impregnation layer are impregnated with potassium carbonate.

8. The multi-layer filter material in accordance with claim 1, wherein the plurality of impregnated activated carbon particles of the impregnation layer includes a first proportion of activated carbon particles impregnated with potassium iodide, and a second proportion of activated carbon particles impregnated with potassium carbonate, and wherein the first proportion impregnated with potassium iodide is greater than the second proportion impregnated with potassium carbonate.

9. The multi-layer filter material in accordance with claim 1, wherein the ion exchange layer is hygroscopic, and contains a plurality of ions that form a toxic environment with water.

10. The multi-layer filter material in accordance with claim 9, wherein the ion exchange layer contains a plurality of acid ions that form an acidic environment with water.

11. The multi-layer filter material in accordance with claim 1, wherein the ion exchange layer includes a plurality of cation exchanger particles.

12. The multi-layer filter material in accordance with claim 1, wherein the ion exchange layer includes a plurality of ion exchanger particles with sulphuric acid groups.

13. The multi-layer filter material in accordance with claim 1, wherein the plurality of ion exchanger particles are at least partially fibrous, and are incorporated into a nonwoven material layer with a plurality of filter material fibres.

14. The multi-layer filter material in accordance with claim 1, wherein the ion exchanger particles comprise at least partially a powder, and are incorporated into a nonwoven material layer with a plurality of filter material fibres.

15. The multi-layer filter material in accordance with claim 1, wherein the active layer directly adjoins the impregnation layer and directly adjoins the ion exchange layer.

16. The multi-layer filter material in accordance with claim 1, wherein the impregnation layer includes a nonwoven material comprising a plurality of filter material fibres and defines an outer side of the multi-layer filter material, the ion exchange layer includes a non-woven material comprising a plurality of filter material fibres and defines an outer side of the multi-layer filter material, and wherein the multi-layer filter material consists of the ion exchange layer, the active layer, and the impregnation layer.

17. The multi-layer filter material in accordance with claim 1, wherein the ion exchange layer directly adjoins the active layer and directly adjoins a first supplementary layer; the impregnation layer directly adjoins the active layer and directly adjoins a second supplementary layer; and the multi-layer filter material consists of the ion exchange layer, the active layer, the impregnation layer, the first supplementary layer, and the second supplementary layer.

18. The multi-layer filter material in accordance with claim 1, wherein the ion exchange layer directly adjoins a first supplementary layer; the impregnation layer directly adjoins the active layer and directly adjoins a second supplementary layer; the ion exchange layer directly adjoins a third supplementary layer; the third supplementary layer directly adjoins the active layer; and the multi-layer filter material consists of the ion exchange layer, the active layer, the impregnation layer, the first supplementary layer, the second supplementary layer, and the third supplementary layer.

19. The multi-layer filter material in accordance with claim 1, wherein the ion exchange layer directly adjoins a first supplementary layer; the impregnation layer directly adjoins a second supplementary layer; the ion exchange layer directly adjoins a third supplementary layer; the impregnation layer directly adjoins a fourth supplementary layer; the active layer directly adjoins the third supplementary layer and directly adjoins the fourth supplementary layer; and the multi-layer filter material consists of the ion exchange layer, the active layer, the impregnation layer, the first supplementary layer, the second supplementary layer, the third supplementary layer, and the fourth supplementary layer.

20. The multi-layer filter material in accordance with claim 17, wherein at least one of the first supplementary layer and the second supplementary layer is a supporting layer, and is permeable to particles with a grain size of less than 1 mm.

21. The multi-layer filter material in accordance with claim 17, wherein at least one of the first supplementary layer and the second supplementary layer is a particle filter layer, impermeable to particles with a grain size of more than 0.1 mm.

22. The multi-layer filter material in accordance with claim 17, wherein at least one of the first supplementary layer and the second supplementary layer define an inlet flow side or an outlet flow side of the multi-layer filter material and is a supporting layer permeable to particles with a grain size of less than 1 mm.

23. The multi-layer filter material in accordance with claim 17, wherein at least one of the first supplementary layer and the second supplementary layer does not define an inlet flow side or an outlet flow side of the multi-layer filter material, and is a particle filter layer, impermeable to particles with a grain size of more than 0.1 mm.

24. An interior air filter element for an air conditioning system of a vehicle comprising:
   a filter body;
   a filter material disposed within the filter body including an active layer having a plurality of non-impregnated activated carbon particles and a first ash content, an impregnation layer having a plurality of impregnated activated carbon particles and a second ash content, and an ion exchange layer having a plurality of ion exchanger particles;

wherein the active layer is disposed between the ion exchange layer and the impregnation layer; and wherein the first ash content in the active layer is less than the second ash content in the impregnation layer.

25. An air conditioning system for a vehicle comprising:
an interior air filter device, wherein the interior air filter device includes at least one interior air filter element, wherein the at least one interior air filter element includes a filter body, a filter material disposed within the filter body having an active layer comprising a plurality of non-impregnated activated carbon particles and a first ash content, an impregnation layer comprising a plurality of impregnated activated carbon particles and a second ash content, and an ion exchange layer having a plurality of ion exchanger particles, wherein the active layer is disposed between the ion exchange layer and the impregnation layer, and wherein the first ash content in the active layer is less than the second ash content in the impregnation layer; and wherein the ion exchange layer is arranged upstream of the active layer and the impregnation layer is arranged downstream of the active layer with respect to a flow direction through the interior air filter device in a mounted state.

* * * * *